No. 711,932. Patented Oct. 28, 1902.
F. M. BISBEE.
SPROCKET WHEEL.
(Application filed July 3, 1902.)
(No Model.) 2 Sheets—Sheet 1.
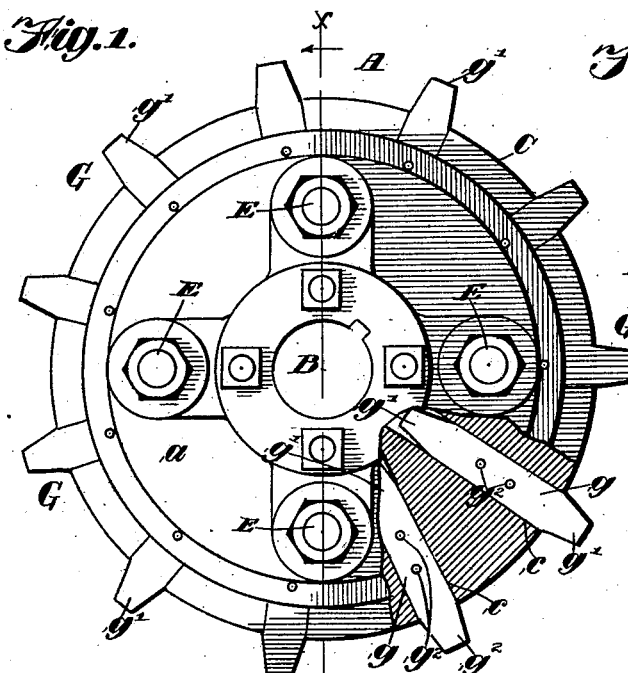
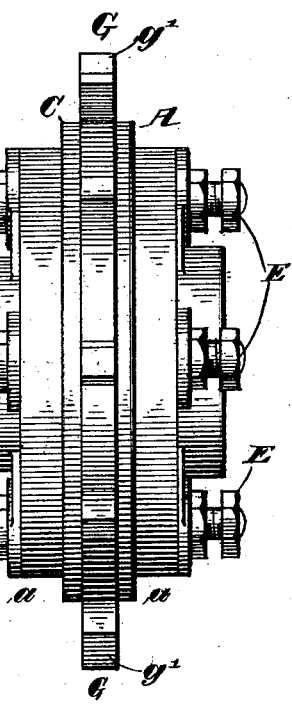
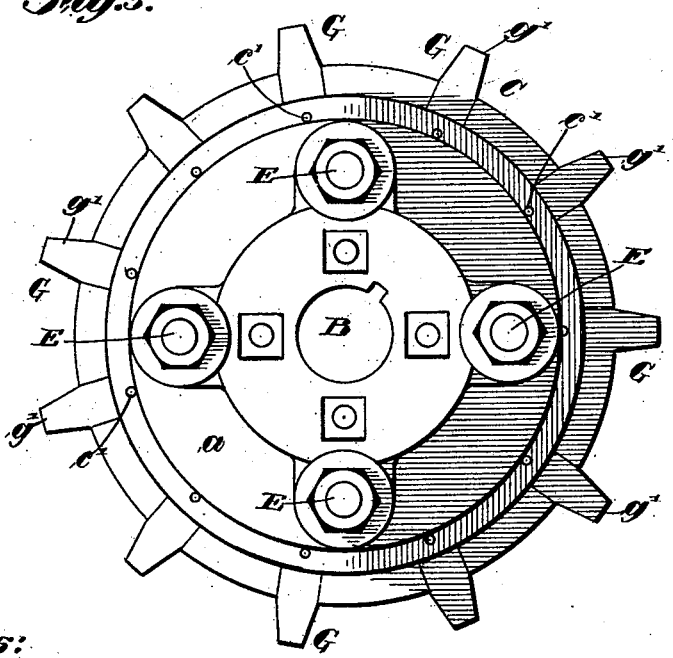
Witnesses:
Inventor:
Frank M. Bisbee
by Chas. G. Page
Atty.
THE NORRIS PETERS CO., PHOTO-LITHO., WASHINGTON, D. C.

No. 711,932. Patented Oct. 28, 1902.
F. M. BISBEE.
SPROCKET WHEEL.
(Application filed July 3, 1902.)
(No Model.) 2 Sheets—Sheet 2.
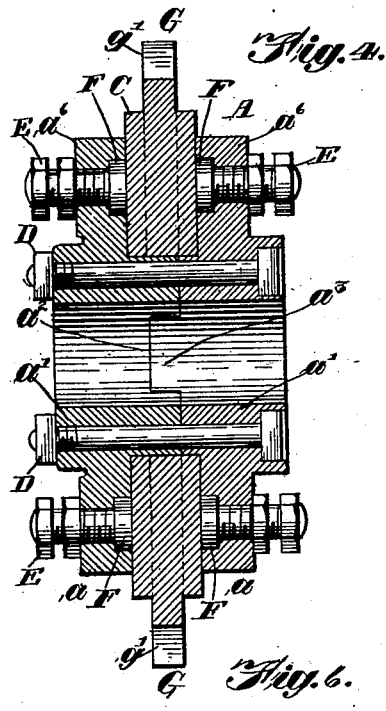
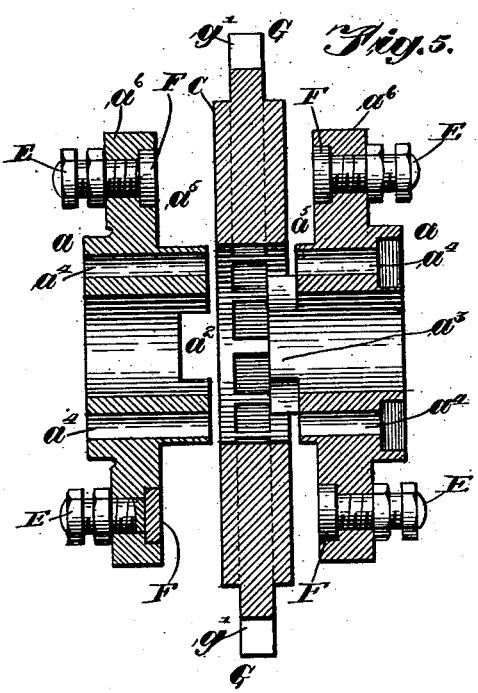
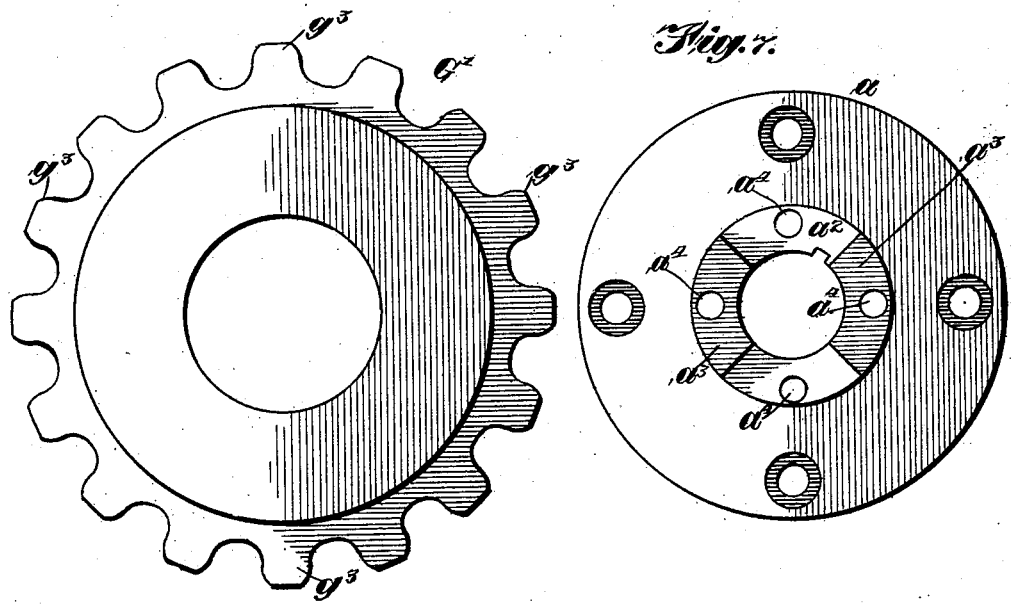
Witnesses:
Inventor:
Frank M. Bisbee
by Chas. G. Page
Atty.

UNITED STATES PATENT OFFICE.

FRANK M. BISBEE, OF CHICAGO, ILLINOIS, ASSIGNOR TO FREDERICK C. AUSTIN, OF CHICAGO, ILLINOIS.

SPROCKET-WHEEL.

SPECIFICATION forming part of Letters Patent No. 711,932, dated October 28, 1902.

Application filed July 3, 1902. Serial No. 114,227. (No model.)

*To all whom it may concern:*

Be it known that I, FRANK M. BISBEE, a citizen of the United States, residing at Chicago, in the county of Cook and State of Illinois, have invented a certain new and useful Improvement in Sprocket-Wheels, of which the following is a specification.

My invention relates to a construction of sprocket-wheel involving a toothed ring which is clamped upon the body of the wheel by a yielding frictional connection, so that when the transmission of power is suddenly opposed by some positive or undue resistance relative slip between the wheel and the toothed ring will take place, and thereby breakage of the machine in which the sprocket-wheel is employed will be avoided.

Objects of my invention are to provide a simple, compact, strong, and durable construction, to vary the degree of firmness with which the toothed ring is held in connection with the body of the wheel without disturbing or affecting the union of certain component parts of which the hub or body of the wheel is composed, to rigidly and effectively bind together certain component parts of the hub or body of the wheel and to maintain such relationship between them while the wheel is in use and regardless of opposition to the transmission of power and consequent relative slip between the body of the wheel and the toothed ring, and to prolong the life of the wheel by providing it with two sets of teeth, which can be used in alternation.

In the accompanying drawings, Figure 1 shows my improved sprocket-wheel in end elevation, a portion of the hub or body portion of the wheel being broken away, so as to expose part of the toothed ring, the part of the toothed ring thus exposed being in section on a plane transverse to the axis of the wheel, so as to show a couple of the reversible double-toothed devices. Fig. 2 is a face view of the sprocket-wheel. Fig. 3 shows the sprocket-wheel in end elevation. Fig. 4 is a section on line $x\,x$ in Fig. 1. Fig. 5 shows the parts of the wheel detached and in section as in the preceding figure. Fig. 6 shows a ring formed with teeth. Fig. 7 shows in elevation the inner end of one of the two parts of the hub or body of the wheel.

The sprocket-wheel is constructed with a hub or body A, having a centrally-arranged bore B for a shaft or spindle and provided between its ends with an annular circumferential recess or channel. A toothed ring C is confined within the circumferential channel of the hub or body and held against independent movement by an adjustable friction clamp device which can be adjusted so as to bind and secure together the toothed ring and the hub or body of the wheel with a degree of firmness sufficient to form a practically rigid connection for all ordinary uses, but adapted to permit relative yield and slip between the toothed ring and hub when some positive resistance is opposed to the transmission of power while the wheel is at work in such machine as it may be employed.

The hub or body A of the wheel is divided transversely between its opposite ends into two component parts $a\,a$, which unite to form a practically solid hub having an annular circumferential recess and a central bearing portion within the radius of the annular bottom of such recess. These two component parts $a$ of the hub are rigidly held together by bolts which extend through the central bearing thus formed by the union of the two parts, as in Fig. 4, wherein the parts referred to are rigidly clamped together by bolts D, arranged parallel with the axis of the wheel and extending through the central bearing portion on lines between the bottom of the circumferential recess and the axle or spindle bore. The bolts thus employed to bind together the component parts of the hub may be screw-bolts, such as suitably long screws, or they may be threaded for nuts, as illustrated. The transverse division of the hub divides its central bearing portion into two corresponding bearing portions $a'\,a'$, which relatively abut and unite, as in Fig. 4, so that when clamped together by the bolts they will practically form a solid central bearing extending from end to end of the hub and affording a practically solid body through which the bolts may extend along lines between the bore of the hub and the circumferential recess or channel in which the toothed ring is confined. The opposing and meeting end surfaces of the central bearing portions $a'$ of the two parts or divisions of the hub may be on corresponding planes; but as a preferred arrangement these two component parts of the hub have their opposing ends adapted to interlock, as by forming them with matching recesses $a^2$ and projections $a^3$, Figs. 4, 5, and 7. The component parts $a$ of the hub are also bored to provide them with corresponding holes $a^4$ for the bolts, and each of said parts is also bored to provide it with a portion of the axle or spindle bore. The transverse division of the hub or body of the wheel into two component parts is made between the opposite side walls of its annular circumferential recess, so that by separating these component parts $a$ of the hub, as in Fig. 5, the recess will be opened laterally, thereby permitting the removal or replacement of the toothed ring. When, however, the two component parts $a$ of the hub are united and bolted together, they will respectively form opposite side walls of an annular recess, whereof the bottom will be formed by a part of the central bearing portion through which the bolts extend. The transverse plane of division of the hub may be adjacent to or coincident with the plane of either side wall of the annular recess. In the construction shown the transverse plane of division is between the two opposite side walls of the annular recess at a point whereby each component part $a$ of the hub is formed with an annular offset $a^5$, Fig. 5. In this way the two annular offsets $a^5$ conjointly form an annular recess when the two component parts $a$ of the hub are united.

The frictional clamping device for holding the toothed ring upon the hub or body of the wheel by a yielding connection comprises set-screws E, bearing in peripheral portions of the hub and arranged to hold the toothed ring by frictional contact. These set-screws may be arranged opposite either side of the toothed ring, and in order to increase the area of frictional contact a friction-plate can be arranged between the inner ends of the set-screws and the toothed ring, whereby the set-screws can be adjusted to clamp the friction-plate against one side of the toothed ring and as a result clamp the opposite side of the toothed ring against one of the side walls of the annular circumferential recess. In the wheel illustrated this principle is extended by clamping the toothed ring between two sets of set-screws arranged to have their bearings in peripheral portions $a^6$ of the parts $a$ of the hub and interposing friction-plates between the toothed ring and these oppositely-arranged sets of set-screws. The friction-plates may be formed by two annular disks, one at each side of the toothed ring, or, as shown, they may consist of disks F, arranged within recesses in the side walls of the annular channel or recess in which the toothed ring is confined.

The toothed ring C is formed with a series of radially-arranged sockets $c$ for the sprocket-teeth, two of such sockets being shown in Fig. 1. The sprocket-teeth G are each composed of an oblong shank or body $g$, having each end adapted to form a tooth portion $g'$. These "double teeth," as they may be termed, are reversible—that is to say, they are removably secured within the radial sockets $c$ by pins $c'$, which can be removed so as to permit the double-toothed shanks to be removed, and thereby permit the shanks $g$ to be withdrawn from the sockets, reversed, and then replaced. In this way if any one or more of the tooth portions $g'$ becomes worn or broken the double tooth as a whole can be removed and reversed. Each double-toothed shank or body $g$ may have a hole for one of the pins $c'$ midway of its ends, or it may have two holes $g^2$, which can be alternately used, as illustrated.

In Fig. 6 I have shown a toothed ring G' having teeth $g^3$ integral therewith. When desired, this toothed ring can be substituted for the toothed ring having reversible teeth.

When the several parts of the sprocket-wheel are assembled and secured together, as hereinbefore described, the two abutting parts $a$ of the hub will practically form a strong and durable solid body which will remain intact during use and which while forming a defined annular channel for the toothed ring is not in any wise disturbed or affected by any adjustment of the set-screws in directions to vary the clamping force with which the toothed ring is held, and all lateral strain, outwardly and in opposite directions, upon the component parts $a$ of the hub as the result of tightening up the set-screws E will be met and rigidly opposed by the tie-bolts D, which are parallel with the axes of the set-screws and which serve to rigidly bind together the component parts $a$ of the hub. The tie-bolts D also rigidly hold the component parts $a$ as against independent rotary play or slip, and by jointing these parts together, as hereinbefore described, further durability of securement is attained.

What I claim as my invention is—

1. A sprocket-wheel comprising a hub having an annular, circumferential recess and divided transversely to the axis of the wheel into two component parts respectively forming opposite side walls of the recess, and uniting to form a central bearing portion between the annular recess and the bore of the hub; bolts extending through the central bearing portion formed by the union of the abutting component parts of the hub and rigidly binding them together; a toothed ring confined within the annular recess; and an adjustable friction clamping device for holding the toothed ring to the hub by a yielding connection.

2. In a sprocket-wheel, a hub having an annular, circumferential recess, and divided transversely into component parts adapted to form opposite side walls of the annular, circumferential recess; bolts extending through the component parts of the hub and rigidly binding them together; a toothed ring confined within the annular, circumferential recess; and an adjustable friction clamping device for holding the toothed ring to the hub by a yielding connection.

3. In a sprocket-wheel, a hub having an annular, circumferential recess, and divided transversely into two component parts respectively forming opposite side walls of such recess and having central portions which unite to form a central bearing portion extending between the bore of the hub and the bottom of the annular recess; bolts extending through the central bearing portion thus formed and rigidly binding together the two component parts of the hub; and a toothed ring confined within the annular, circumferential recess and held to the hub by a yielding connection.

4. In a sprocket-wheel, a hub having an annular, circumferential recess and divided transversely between opposite sides of such recess into two component parts respectively forming opposite side walls of the recess and conjointly forming the bottom wall thereof; bolts extending through said two component parts on lines between the bottom of the recess and the bore of the hub, and rigidly binding such component parts together; a toothed ring confined within the annular, circumferential recess; and a friction clamping device for holding the toothed ring on the hub by a yielding connection.

5. In a sprocket-wheel, a hub having an annular, circumferential recess and divided transversely into component parts forming opposite side walls of such recess and rigidly bolted together; a toothed ring confined within the annular, circumferential recess; and an adjustable, friction clamping device adapted for holding the toothed ring upon the hub by a yielding connection and comprising set-screws bearing in the hub and arranged for applying binding pressure laterally against the toothed ring.

6. In a sprocket-wheel, a hub having an annular, circumferential recess and divided transversely into component parts which are rigidly secured together and which form opposite side walls of such recess; a toothed ring confined within the annular, circumferential recess; and an adjustable friction clamping device involving a friction-plate arranged between the toothed ring and a side wall of the annular, circumferential recess; and a set-screw bearing in the hub and arranged for clamping the friction-plate against the toothed ring.

7. In a sprocket-wheel, a hub having an annular, circumferential recess and divided transversely into component parts which are rigidly secured together and which form opposite side walls of such recess; a toothed ring confined within the annular, circumferential recess; friction-plates arranged between the toothed ring and opposite side walls of the annular, circumferential recess; and adjustable set-screws bearing in the hub and arranged to clamp the friction-plates against the toothed ring.

8. In a sprocket-wheel, a hub having an annular, circumferential recess and divided transversely into component parts forming opposite side walls of said recess and having central portions uniting to form a central bearing between the annular recess and the bore of the hub; bolts extending through the central bearing portion formed by the union of the abutting component parts of the hub and rigidly binding them together; a toothed ring confined within the annular, circumferential recess; and a clamping device involving adjustable set-screws bearing in the hub and arranged to apply binding pressure against the toothed ring.

9. In a sprocket-wheel, a hub having an annular, circumferential recess, and divided transversely into component parts adapted to provide opposite side walls of said recess; bolts arranged to rigidly bind together the component parts of the hub; a toothed ring confined within the annular, circumferential recess; and a clamping device involving a friction-plate arranged between the toothed ring and a side wall of the recess, and a set-screw bearing in the hub and arranged for clamping the friction-plate against the toothed ring.

10. In a sprocket-wheel, a hub having an annular, circumferential recess, and divided transversely into component parts forming opposite side walls of such recess; bolts arranged to rigidly bind together the component parts of the hub and extending on lines between the annular recess and the bore of the hub; adjustable set-screws bearing in the rigidly-united component parts of the hub; and a toothed ring confined within the annular, circumferential recess and clamped between the set-screws.

11. In a sprocket-wheel, a hub having an annular, circumferential recess; a tooth-holding ring confined within the annular, circumferential recess and having a yielding connection with the hub, said ring being provided with a series of radially-arranged sockets; and reversible sprocket-teeth detachably held within the radially-arranged sockets and each consisting of a shank or body portion adapted to form a tooth at each end thereof and detachably held in one of the said sockets, whereby it can be reversed so as to permit its tooth ends to be used in alternation.

FRANK M. BISBEE.

Witnesses:
FRANK P. CLEVELAND,
OTTILIE C. MEERING.